US008904239B2

(12) United States Patent
Seren et al.

(10) Patent No.: US 8,904,239 B2
(45) Date of Patent: Dec. 2, 2014

(54) SYSTEM AND METHOD FOR AUTOMATED TEST CONFIGURATION AND EVALUATION

(75) Inventors: Burak Seren, New York, NY (US); Nicholas Patrick Johns, Lutz, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 282 days.

(21) Appl. No.: 13/399,498

(22) Filed: Feb. 17, 2012

(65) Prior Publication Data

US 2013/0219217 A1 Aug. 22, 2013

(51) Int. Cl.
*G06F 11/00* (2006.01)
(52) U.S. Cl.
USPC .......................................... 714/46
(58) Field of Classification Search
CPC .......... G06F 11/00; G06F 11/07; G06F 11/06
USPC .......................................... 714/46
See application file for complete search history.

(56) References Cited

U.S. PATENT DOCUMENTS

| 6,341,361 | B1 * | 1/2002 | Basto et al. .................. 714/726 |
| 6,983,216 | B2 * | 1/2006 | Lam et al. ..................... 702/119 |
| 7,129,831 | B2 * | 10/2006 | Martin et al. ................. 340/506 |
| 7,857,208 | B2 * | 12/2010 | Drummond et al. .......... 235/379 |
| 8,185,877 | B1 * | 5/2012 | Colcord ......................... 717/127 |
| 2003/0202638 | A1 * | 10/2003 | Eringis et al. ............. 379/15.01 |
| 2006/0098789 | A1 * | 5/2006 | Martin et al. ................ 379/1.01 |
| 2006/0265170 | A1 * | 11/2006 | Gedlinske et al. ............ 702/108 |
| 2008/0270951 | A1 * | 10/2008 | Anand et al. ...................... 716/4 |
| 2009/0011396 | A1 * | 1/2009 | Gedlinske et al. ............ 434/322 |
| 2009/0307763 | A1 * | 12/2009 | Rawlins et al. .................... 726/5 |
| 2010/0153780 | A1 * | 6/2010 | Kirtkow et al. ................ 714/37 |
| 2013/0018786 | A1 * | 1/2013 | Sher ............................... 705/40 |
| 2013/0275283 | A1 * | 10/2013 | How et al. ....................... 705/34 |
| 2014/0058909 | A1 * | 2/2014 | Lobana et al. .................. 705/30 |

* cited by examiner

*Primary Examiner* — Amine Riad
(74) *Attorney, Agent, or Firm* — Snell & Wilmer L.L.P.

(57) ABSTRACT

A comprehensive system for enabling automated configuration and testing of software applications and services is disclosed. The system includes test interfaces, a test database and test functionality. Configuration functionality allows for rapid, accurate and efficient set up of one or more test accounts. Data manipulation interfaces and methods allow for the inspection of state variables and manipulating state-based data to simulate, initiate and reverse transactional data. Application programming interfaces enable the testing of external systems with a target system that is simulated in the testing environment.

38 Claims, 3 Drawing Sheets

SYSTEM AND METHOD FOR AUTOMATED TEST CONFIGURATION AND EVALUATION

FIELD

The present disclosure generally relates to enabling automated allocation and configuration of testing environments, data and users for a software based system.

BACKGROUND

Software developers typically use a separate test environment to test applications that interface with another software application or service (e.g. a web-based service). In order to effect testing, a software developer typically creates test accounts and other testing data with which the test environment interacts. However, setting up a test environment often includes manual and repetitive tasks that increase the time and cost associated with the software development and integration process.

As such, a long felt need exists for an integrated, end-to-end, automated configuration, analysis and evaluation tool that is open to various entities that may wish to interface with a software system or service.

SUMMARY

Methods and systems provide automated setup, account creation, data examination, data manipulation and/or test execution for software systems. In various embodiments, the system includes graphical user interfaces with novel functionality, application programming interfaces, test databases, test systems or methods to mirror preexisting "live" systems and test documentation and reporting capabilities.

In various embodiments, an automated configuration and testing system receives a configuration request to create a test account. In response to receiving the request, the system creates the test account (for example, based upon preexisting rules or criteria) by populating data in a test database. The system determines a first funding account from a plurality of funding accounts and associates the first funding account with the test account. The system receives an execution request to execute a transaction by the test account and executes the request. The system enables the user to examine data associated with at least one of the test account, the funding account and the transaction.

BRIEF DESCRIPTION OF THE DRAWINGS

A more complete understanding of the present inventions may be derived by referring to the detailed description and claims when considered in connection with the Figures, wherein like reference numbers refer to similar elements throughout the Figures, and:

DETAILED DESCRIPTION

Figure 1:
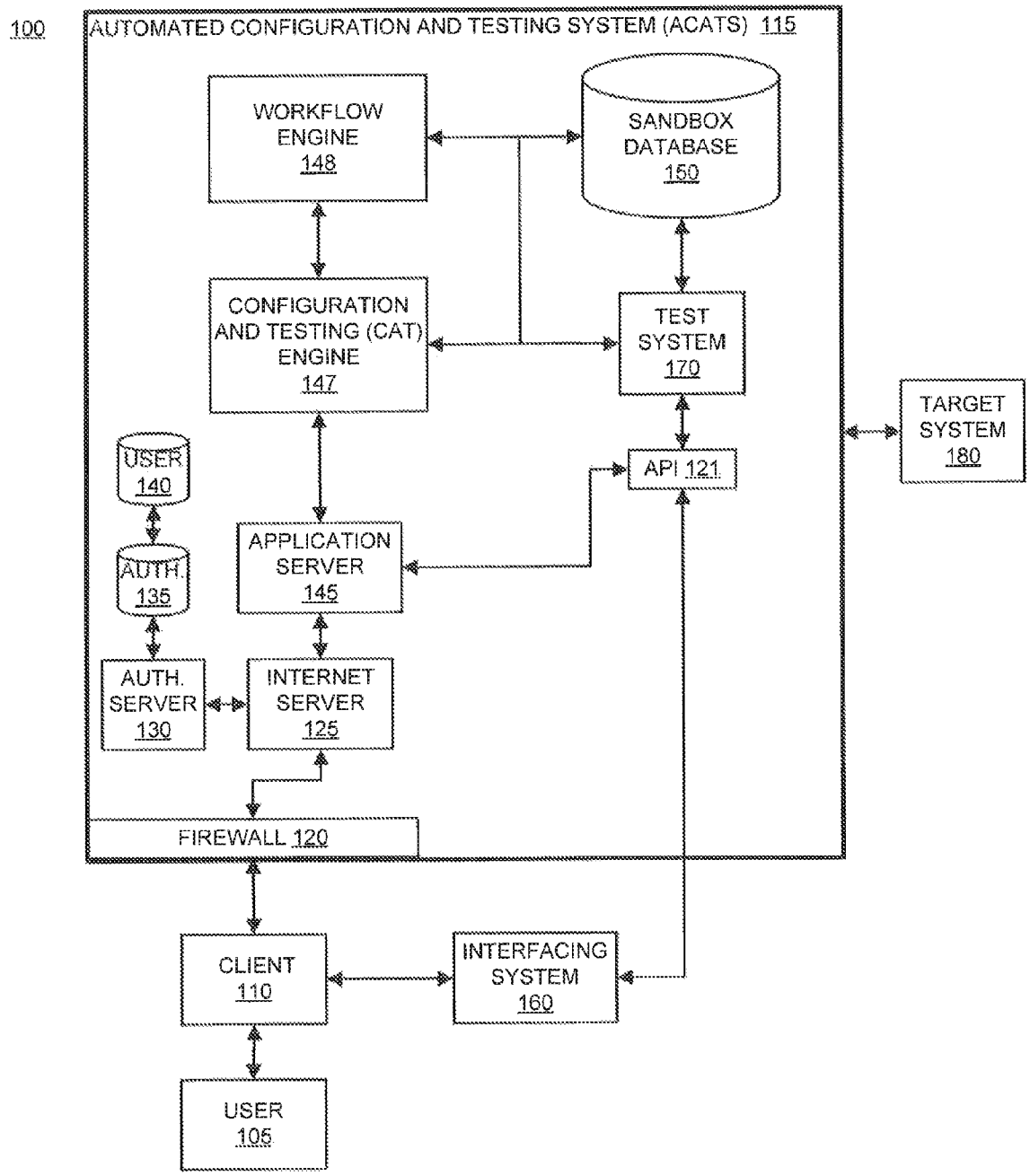
FIG. 1 is a block diagram illustrating major system components of an automated configuration and testing system, in accordance with various embodiments.

The systems and methods provide an improved, automated, integrated, online system for configuration, data creation and testing software.

Various embodiments of the automated configuration and testing system ("ACATS") may be implemented by a system, computer readable medium, internet based system, a method or any combination thereof. The systems and methods include a unique combination of one or more features associated with testing software via a testing environment or "sandbox". In various embodiments, a "sandbox" is a replica of a live or real (e.g., production) system ("target system"). In various embodiments, ACATS provides a "sandbox manager" for creating users, user accounts, data, modules and transactions for the testing, evaluation and/or simulation of target system using the test system. In various embodiments, the target system may be, for example, a social networking system, a e-commerce system and/or a financial transaction system that enables online commerce such as, for example, peer-to-peer transfers of value (e.g., money).

In one embodiment, an interfacing system is designed and developed to interact with a target system. For example, the interfacing system could be an app (a.k.a., a "micro application"; e.g. an iPhone application) and the target system could be Facebook® and developers of the app may wish to test the app to determine whether the app will correctly interact with Facebook to cause a desired result. To permit testing of the app, companies like Facebook may provide a "sandbox" system which may be essentially a replica of the real system (i.e., the system that this the "target" for which the interfacing system will interface), except that the sandbox system presents "dummy" user accounts, as opposed to real user accounts. In various embodiments, the dummy accounts are created by the developer of the app and may comprise the same state data as the target system. For example, if the target system is Facebook, a Sandbox account may include a user name, permission settings, wall postings, friends, photos etc.

In various embodiments, the sandbox manager is an application that presents user interfaces, APIs and functions that are separate from the user interface experience of the sandbox test environment. In various embodiments, the sandbox manager codebase may or may not be separate from the codebase of the sandbox. The sandbox manager permits the creation of "dummy" accounts, and also permits retrieval and manipulation of attributes and/or state data associated with the accounts without navigating of the sandbox user interfaces. In various embodiments, the sandbox manager may present a screen that lists, in tabular format (or some other convenient format), all of the state data required for definition of a user account. A developer of an interfacing system (e.g. an "app") is enabled to create the dummy accounts for testing by entering attribute values or state data directly into the fields (example: the name "John Doe" is entered into a username field; "1" is entered into a number-of-wall-postings field; "I am at the park" is entered into a wall posting field, and so on). For example, in various embodiments, the sandbox manager may auto-populate name for the dummy accountholder, with the premise of this option being that most foreseeable test scenarios would not turn on the name of the dummy accountholder.

Exemplary benefits of the system include providing rapid creation and configuration of test environments and enabling testing and evaluation of a target system via various online interfaces and data inspection and manipulation tools. ACATS benefits target systems by allowing third-party testers to rapidly configure and test new functionality and/or modules that interface (e.g. via an application programming interface, "API") with the target system ("interfacing systems"). Thus, for example, a target system or service (e.g., a web service) that provides a transaction platform for merchants and others to complete financial transactions, benefits from ACATS in allowing interfacing systems to rapidly and efficiently setup, test and evaluate interfacing systems; thus, driving transactions and usage on the target system platform. Interfacing systems benefit by reduced cost and time associated with testing and/or certifying an interfacing system with the target system.

While the embodiments described herein are described in sufficient detail to enable those skilled in the art to practice the disclosure, it should be understood that other embodiments may be realized and that logical and mechanical changes may be made without departing from the spirit and scope of the invention. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the system includes a user interface (UI), a software module, logic engines, numerous databases and computer networks. While the system may contemplate upgrades or reconfigurations of existing processing systems, changes to existing databases and system tools are not necessarily required by the system and method.

While the description references specific technologies, hardware, equipment, system architectures and data management techniques, practitioners will appreciate that this description is but one embodiment and that other devices and/or methods may be implemented without departing from the scope of the disclosure. Similarly, while the description may reference a user interfacing with the system via a personal computer user interface, practitioners will appreciate that other interfaces may include mobile devices, kiosks and handheld devices such as personal digital assistants.

"Entity" may include any individual, consumer, consumer, group, business, organization, government entity, transaction account issuer or processor (e.g., credit, charge, etc), merchant, consortium of merchants, consumer, account holder, charitable organization, software, hardware, and/or any other entity.

An "account", "account number" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account. The system may include or interface with any of the foregoing accounts or devices, or a transponder and RFID reader in RF communication with the transponder (which may include a fob). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

A "transaction account" may include any account that may be used to facilitate a financial transaction. A financial institution or transaction account issuer includes any entity that offers transaction account services to consumers. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution, but these participants are not shown.

A "financial processor," "payment network," or "payment system" or "transaction account issuer" may include any entity which processes transactions, issues accounts, acquires financial information, settles accounts, conducts dispute resolution regarding accounts, and/or the like.

FIG. 1 shows an exemplary block diagram illustrating major system components for enabling ACATS 115. System 100 facilitates interaction between a user 105 and ACATS 115 through, in various embodiments, client 110 with a network connection to an Internet server 125 by way of the Internet. In various embodiments, Internet server 125 employs authentication server 130 to validate credentials, assign proper permissions, and retrieve preferences information for authorized user's 105 of ACATS 115.

In various embodiments, Internet server 125 employs application server 145 to manage various applications and utilities that are utilized by system 100. In various embodiments, application server utilizes APL+Win, JBOSS utilizing SEAM, Richfaces JBPM, and/or other Java libraries (jQuery and Javascript), JAX-WS, Apache POI, and/or Quartz. In various embodiments, Internet server 125 interacts directly with the various systems and components disclosed herein.

ACATS 115 may include any number of computing platforms and databases such as, for example, configuration and testing engine ("CAT engine") 147, workflow engine 148 and sandbox database 150. Other systems may include, for example, accounting systems, financial transaction systems, reporting systems, new accounts systems, management information systems, business information systems, external data sources, proprietary systems and the like. Each of the systems may be interconnected within by a network in via any method and/or device described herein. A middleware server and/or application server 145 may serve as an intermediary between the various systems to ensure appropriate communications between disparate platforms. A report engine retrieves and/or is provided with data from certain of the various systems in order to generate notices, bills, contracts, messages, audit reports, and the like.

ACATS 115 may include test system 170 (as shown in FIG. 1) or test system 170 may be an independent system. Test system 170 may be a replica of target system 180, may include additional modules or functionality from target system 180, or may be a completely different system. In various embodiments, test system 170 replicates target system 180 and interfacing system 160 accesses test system 170 (e.g., via API 121) in order to simulate the interface between interfacing system 160 and target system 180.

System 100, ACATS 115 and/or any other components discussed herein may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases.

As will be appreciated by one of ordinary skill in the art, one or more of the components of system 100 may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system contemplates uses in association with web services, transaction processing, utility computing, pervasive and individualized computing, security and identity solutions, autonomic computing, commodity computing, mobility and wireless solutions, open source, biometrics, grid computing and/or mesh computing.

User 105 may include any entity that utilizes system 100 or ACATS 115 functionality. User 105 may include, for example, a developer of an interfacing system 160 who accesses ACATS 115 to set up users, user accounts, data and/or transactions for testing and evaluation. User 105 may also include interfacing system 160. Interfacing system 160 may access ACATS 115 via any network, protocol or method discussed herein. In various embodiments, interfacing system 160 accesses ACATS 115 via firewall 120. In various embodiments, interfacing system 160 accesses ACATS 115 via API 121. In various embodiments, user 105 may interface with ACATS 115 via any communication protocol, device or method discussed herein or known in the art. For example, user 105 may interact with ACATS 115 by way of an Internet browser at client 110.

Client 110 comprises any hardware and/or software suitably configured to facilitate requesting, retrieving, updating, analyzing, entering and/or modifying data. For example, in various embodiments, client 110 is configured to facilitate input, receipt, presentations, analysis and/or review of information relating to IP assets, merchandising of IP assets and facilitating IP transactions. Client 110 includes any device (e.g., personal computer) which communicates (in any manner discussed herein) with ACATS 115 via any network discussed herein. Such browser applications comprise Internet browsing software installed within a computing unit or system to conduct online transactions and/or communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that client 110 may or may not be in direct contact with ACATS 115. For example, client 110 may access the services of ACATS 115 through another server, which may have a direct or indirect connection to Internet server 125. Client 110 may be mobile or may be located in a home or business environment with access to a network. In an exemplary embodiment, access is through a network or the Internet through a commercially-available web-browser software package.

As those skilled in the art will appreciate, client 110 includes an operating system (e.g., Windows NT, 95/98/2000, OS2, UNIX, Linux, Solaris, MacOS, Android, iPhone OS etc.) as well as various conventional support software and drivers typically associated with computers or computing devices. Client 110 may include any suitable personal computer, mobile device, phone, network computer, workstation, minicomputer, mainframe or the like. Client 110 can be in a home or business environment with access to a network. In an exemplary embodiment, access is through a network or the Internet through a commercially available web-browser software package.

In various embodiments, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

Client 110 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network.

Client 110 may include any number of applications, code modules, cookies, and the like to facilitate interaction with ACATS 115 in order to, for example, input data, complete templates/forms, view reports, validate data, approve data, review IP asset info, participate in a negotiation, review due diligence documents, respond to a survey, and the like. In various embodiments, client 110 may store user 105 preferences and/or any other information disclosed herein on a hard drive or any other local memory device. Accordingly, client 110 may retrieve and store consumer information within a memory structure of client 110 in the form of a browser cookie, for example. In another embodiment, client 110 retrieves information relating to user 105 from ACATS 115 on establishing a session with Internet server 125.

Firewall 120, as used herein, may comprise any hardware and/or software suitably configured to protect ACATS 115 components from users, other networks and systems. Firewall 120 may reside in varying configurations including stateful inspection, proxy based and packet filtering among others. Firewall 120 may be integrated as software within Internet server 125, any other ACATS 115 components or may reside within another computing device or may take the form of a standalone hardware component. Although depicted as a single firewall in FIG. 1, one skilled in the art will recognize that a firewall or multiple firewalls may be implemented throughout system 100 and/or ACATS 115 to enable system and data security.

Internet server 125 may include any hardware and/or software suitably configured to facilitate communications between client 110 and one or more ACATS 115 components. Further, Internet server 125 may be configured to transmit data to client 110 within markup language documents (e.g., XML, HTML, etc.). As used herein, "data" may include encompassing information such as commands, queries, files, data for storage, and/or the like in digital or any other form. Internet server 125 may operate as a single entity in a single physical location or as separate computing components located together or in separate physical locations.

Internet server 125 may provide a suitable web site or other Internet-based graphical user interface which is accessible by consumers. In various embodiments, Internet server 125 employs RedHat Linux Enterprise 5.x Server and Apache Http server. In various embodiments, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to markup language based documents (e.g., HTML), various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (e.g. http://yahoo.com/stockquotes/ge) and an IP address (e.g. 123.4.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

In order to control access to components of ACATS 115, Internet server 125 may invoke authentication server 130 in response to user 105 submissions of authentication credentials received at Internet server 125 from client 110. Authentication server 130 may include any hardware and/or software suitably configured to receive authentication credentials, encrypt and decrypt credentials, authenticate credentials, and grant access rights according to privileges (e.g., pre-defined privileges) attached to the credentials. Authentication server 130 may grant varying degrees of application and data level access to users based on information stored within a database and/or any other known memory structure.

CAT engine 147 comprises hardware and/or software modules that execute processes, access data from sandbox database 150 and interact with workflow engine 148 to enable the functionality of ACATS 115. For example, CAT engine 147 may receive a request to create a new user in test system 170 and may executed various automated processes to create the new user and to populate data on sandbox database 150 such that the functionality of interfacing system 160 may be tested using the new user.

Workflow engine 148 comprises hardware and/or software modules that implement process definition, tracking and execution. Workflow engine 148 may comprise one or more software applications, modules or data objects. The software may be any executable code written in any software programming language, such as, for example Java®. For example, workflow engine 148 reads data from sandbox database 150 and instantiates a data object (e.g. a Java Bean®) to store the data for use by software modules or other objects. In various embodiments, workflow engine 148 executes an automated or partially automated process such as a user account creation process, user creation or deletion process, data population process, etc.

Sandbox database 150 may include any hardware and/or software suitably configured to facilitate storing data relating to, for example, configuration, testing, registration, transactions, account settings, user setting, etc. In various embodiments sandbox database 150 stores preconfigured data and/or rules for automatically creating users for test system 170. In various embodiments, sandbox database 150 includes the database schema of a "production" database associated with target system 180.

One skilled in the art will appreciate that system 100 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of system 100, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with system 100 by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system 100, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in various embodiments, the header or trailer is not stored on the transaction device along with the associated issuer-owned data but instead the appropriate action may be taken by providing to the transaction instrument user at the stand-alone device, the appropriate option for the action to be taken. System 100 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 100 may consist of any combination thereof at a single location or at multiple locations, wherein each database or system 100 includes any of various suitable security features, such as firewalls, access codes, encryption, decryption, compression, decompression, and/or the like.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

The invention may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and/or the like, which may carry out a variety of functions under the control of one or more microprocessors or other control devices.

Similarly, the software elements of system 100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Software elements (e.g., modules, engines, etc) may be implemented as a web service. In various embodiments, web services are implemented using Webservice Interoperability Organization Basic Profile 1.1.

Further, it should be noted that system 100 may employ any number of conventional techniques for data transmission, signaling, data processing, network control, and/or the like. Still further, system 100 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory (or "computer-readable medium") that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

System 100 combines unique standardization, process improvement, workflow, data integration, searching, and data security features to enable a seamless, feature-rich IP marketplace. While certain embodiments of the present invention are disclosed herein in terms of a patent, practitioners will appreciate that the teachings of the present invention may be equally applicable interchangeably between any type of intellectual property including, for example: trade marks, trade dress, know how, trade secrets, copyrights, etc. Furthermore, ACATS 115 functionality may be disclosed herein in terms of enabling testing of a peer-to-peer transaction system, those of skill in the art will appreciate that ACATS 115 functionality may be used in various embodiments to enable or facilitate configuration and testing of any interfacing system 160 and/or target system 180.

Referring again to FIG. 1, in various embodiments, when user 105 logs onto an application, Internet server 125 may invoke an application server 145. Application server 145 invokes logic in CAT engine 147 by passing parameters relating to the user's 105 requests for data. ACATS 115 manages requests for data from CAT engine 147 and communicates with system 101 components. Transmissions between user 105 and Internet server 125 may pass through a firewall 120 to help ensure the integrity of ACATS 115 components. Practitioners will appreciate that the invention may incorporate any number of security schemes or none at all. In various embodiments, Internet server 125 receives requests from client 110 and interacts with various other system 100 components to perform tasks related to requests from client 110.

Internet server 125 may invoke an authentication server 130 to verify the identity of user 105 and assign roles, access rights and/or permissions to user 105. In order to control access to the application server 145 or any other component of ACATS 115, Internet server 125 may invoke an authentication server 130 in response to user 105 submissions of authentication credentials received at Internet server 125. When a request to access system 100 is received from Internet server 125, Internet server 125 determines if authentication is required and transmits a prompt to client 110. User 105 enters authentication data at client 110, which transmits the authentication data to Internet server 125. Internet server 125 passes the authentication data to authentication server which queries the user database 140 for corresponding credentials. When user 105 is authenticated, user 105 may access various applications and their corresponding data sources.

ACATS 115 enables user 105 (e.g., a developer of interfacing system 160) to configure users, accounts, data and transactions for testing associated with a target system (e.g., target system 180). In various embodiments, ACATS 115 enables the functionality of a "sandbox manager." A Sandbox Manager includes software, logic, processes and databases that a user can access to create and manage test accounts for a "sandbox."

A sandbox includes a software system (e.g. test system 170) that is used for testing software that is under development (e.g. interfacing system 160). In various embodiments, ACATS 115 enables a sandbox of a peer-to-peer payment system. For example, test system 170 and sandbox database 150 enable test transactions for transferring value (e.g., money) from test account to test account (e.g., from a test customer account to a test merchant account). Sandbox database 150 stores the various test transactions.

ACATS 115 enables automated testing and evaluation by a user 105. In various embodiments, user 105 may be associated with an application (e.g. interfacing system 160). The user may submit a registration request to ACATS 115. The registration request may be received via a registration interface or via an API. The registration request may include user profile information and may identify an application or "interfacing system" that is to be associated with the user. ACATS 115 registers user 105 in ACATS 115 using the user profile information. In various embodiments, as part of the registration process, ACATS 115 may: create one or more test accounts and associate the test accounts with the user; create one or more funding accounts and associate the funding accounts with the user; create a default test account and assign a funding account to the default test account; and/or designate a default test account as an owner of an application.

In various embodiments, the user that is designated the owner of an application may have different permissions or functional capabilities with respect test system or processing logic on the test system. For example, in various embodiments, an application owner may initiate a transaction to send money to a different test account and the send money transaction may occur automatically (with further authorization or configuration or rejection). In various embodiments, CAT engine 147 enables functions at both the user account and the test account level. For example, CAT 147 functions that are associated with a user account may include message displays, ACH clearance functions, allocation of funding sources, etc while functions associated with a test account may include deleting, refreshing transaction accumulation limits, locking/unlocking test accounts, changing test account balances, etc.

For example, a developer may be developing an application called ShoeStore and the developer registers with ACATS 115. ACATS 115 registers the developer (e.g. user 105), creates a first test account, associates the test account with the developer registration information, assigns the first test account as the application owner of the ShoeStore application, and allocates five bank accounts and five credit card accounts (both of which are funding accounts) to the developer. In various embodiments, one or more of the previous steps may not occur automatically. In various embodiments, other configuration tasks may occur either automatically or in response to requests received from the developer. In various embodiments, the developer may use the ACATS 115 interfaces or various API function calls to, for example, create test accounts, assign funding accounts to test accounts, associate the ShoeStore application with a different owner (i.e. a different test account).

In various embodiments, test system 170 includes similar or identical functionality and database structures as a production or "live" system (e.g., target system 180). Thus, user 105 is able to create and test functionality on the test system without exposing the "live" system to test data and without consuming the computing resources (e.g. bandwidth, processing power, memory, etc.) of the live system. In various embodiments, an interfacing system 160 is developed, for example, by a third party. The third party may wish to test the functionality of the interfacing system 160 as it interfaces with the test system. User 105 may configure a test environment by creating users and funding accounts and pre-populating transactions in the database in order to simulate various test conditions. ACATS 115 includes a variety of graphical user interfaces to enable these configuration activities. In various embodiments, ACATS 115 also includes APIs that can be invoked by the interfacing system in order to execute various functions in the test system. ACATS 115 includes various interfaces and tools to assist in evaluating transactional data and other system conditions during various points during and after a transaction.

In various embodiments, ACATS 115 permits the rapid generation of test accounts via a user interface that may be rendered via a web browser. ACATS 115 presents the various state data defining each of the test accounts for easy review by a software developer or other user, such as a software tester. ACATS 115 may also allow for direct setting or resetting of one or more state variables. In various embodiments, ACATS 115 enables sharing of test accounts between developers, such as developers working together on a team.

Figure 2:
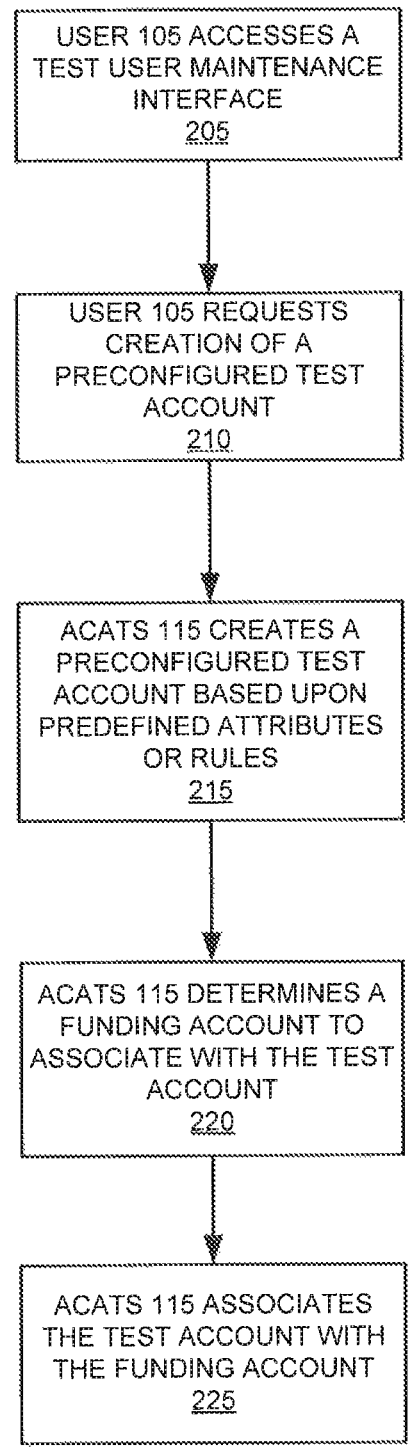
FIG. 2 is a flow chart illustrating an exemplary process for creating a test account, in accordance with various embodiments.

With reference now to FIG. 2, in various embodiments, ACATS 115 enables creation of a test account. User 105 logs in to ACATS 115 and accesses a test account maintenance interface (step 205). User 105 requests creation of a preconfigured test account (step 210). ACATS 115 creates a preconfigured test account based upon predefined attributes or rules (step 215). In various embodiments, creating a test account includes populating data in sandbox database 150; populating data may include inserting, modifying, updating or deleting data base records (i.e., rows) or data fields (i.e., columns) within a database record. In various embodiments, creating a test account comprises creating a test account based upon at least one of a predetermined set of attributes, predetermined attribute values and predetermined user accounts. Predefined attributes may include user name, account name, other user demographic information, user capabilities and restrictions and other system entities to associate with the user.

In various embodiments, user 105 may request to create a custom test account and ACATS 115 presents a custom user creation interface that allows user 105 to specify all or a portion of the data to be associated with a test account. For instance, user 105 may wish to create a test account designated with a particular user name or create a test account associated with a particular number or type funding accounts. In various embodiments, ACATS 115 enables user 105 to request creation of multiple test accounts at one time. The multiple accounts may comprise predefined accounts, custom accounts or a combination of predefined and custom accounts.

With reference again to FIG. 2, ACATS 115 determines a funding account to associate with the test account (Step 220). In various embodiments, ACATS may determine the funding account based upon a predetermined rule or a predefined account. A funding account may be any transaction account such as, for example, a bank account, a debit account, a prepaid account, a credit account, a brokerage account, etc). A funding account may be associated with an account balance, a daily transaction accumulation counter, a monthly accumulation counter, a daily transaction limit and/or a monthly transaction limit. The funding account may be a preexisting account chosen from a pool of preexisting accounts on test database 150 that are available for use by the registered user (e.g., the developer that registered the sandbox) or the funding account may be created by ACATS 115. ACATS 115 associates the test account with the funding account (Step 225).

User 105 may configure a test environment by creating test accounts and funding accounts and pre-populating transactions in the database in order to simulate various test conditions. ACATS 115 provides various data configuration interfaces to enable user 105 to populate test data. In various embodiments, ACATS 115 provides user interfaces for creating a new test account, creating a new custom test account, creating multiple test accounts, viewing/editing test account information, viewing editing funding sources and editing funding source data. For example, in various embodiments, ACATS 115 provides an interface to allow user 105 to "lock" a test account so that the test account is temporarily disabled with respect to, for example, the ability to log in to and/or execute test system 170 functionality.

ACATS 115 may also provide the ability for user 105 to modify or otherwise manipulate test account and funding account information. For example, in various embodiments, ACATS 115 provides an interface that enables user 105 to change an account balance of a funding account, reset an account balance, reset daily or monthly spending limits associated with a funding account and/or delete a funding account.

In various embodiments, ACATS 115 provides an automated clearinghouse (ACH) function. One of skill in the art will recognize that the ACH function may be simulated (for testing purposes) or may provide an actual ACH fund transfer. ACATS 115 provides test account interface to manage the funds available in the test account. User 105 wishes to move funds from a funding account (e.g. a bank account) to the test account. In various embodiments, User 105 specifies the amount of an ACH transfer and initiates the ACH fund transfer from the bank account to the test account. User 105 may initiate the ACH transfer in a variety of ways, including via a command button or menu item on an ACATS 115 interface or by invoking API 121. In various embodiments, the ACH fund transfer may occur during periodic (e.g., daily) batch processing. The ACH may also occur on demand. ACATS 115 provides functionality whereby the user may request funds that are pending an ACH transfer be released immediately. In various embodiments, the ACH transfer may occur on demand upon ACATS 115 receiving the ACH transfer request.

Figure 3:
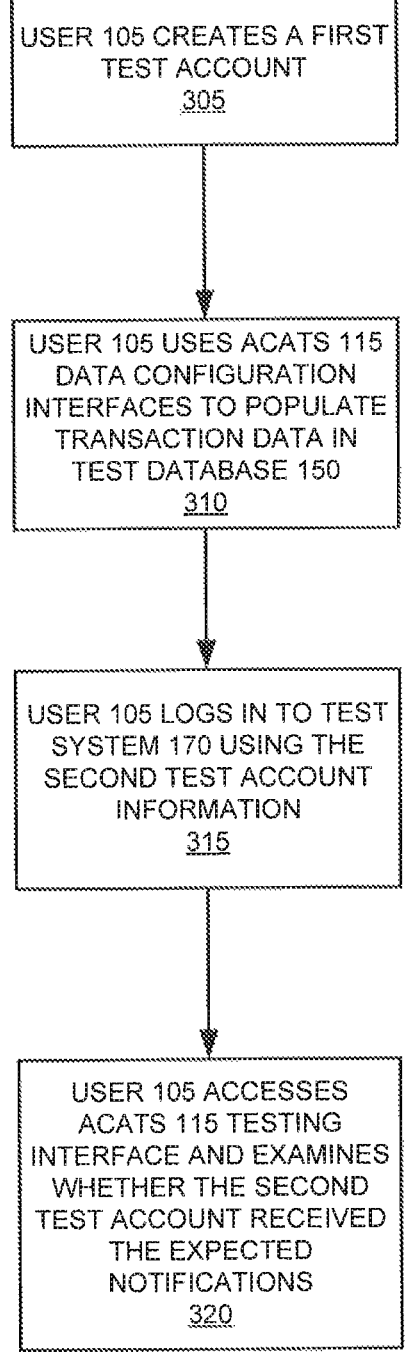
FIG. 3 is a flow chart illustrating an exemplary process for examining test data, in accordance with various embodiments.

FIG. 3 illustrates a series of user actions enabled, in various embodiments, by ACATS 115. User 105 creates a first test account (step 305) as described above. User 105 uses ACATS 115 data configuration interface to populate transaction data in test database 150 (step 310) that indicates that a first test account has sent money to a second user. User 105 logs in to test system 170 using the second user account information (step 315) and examine whether the second user received the expected notifications (step 320) associated with receiving money via a transaction from the first user.

In various embodiments, ACATS 115 includes a messaging interface that enables user 105 to review test system messages associated with one or more of test accounts. For example, if a first account initiates a transfer of funds to a second account, ACATS 115 or one of its components (e.g. test system 170) may generate a message to the first account. User 105 may access the messaging interface in order to review the message. Test system messages comprise at least one of emails and text messages. In various embodiments, messaging interface is configured to present the test system messages at one or more levels (e.g., a user, a test account and a funding account level). In various embodiments, messaging interface can be configured to filter messages by a particular characteristic of the message (e.g., whether the message is email or text, whether the message is directed to a test account, funding account and/or user level, etc.).

In various embodiments, ACATS 115 includes an interface that enables a consolidated view of state data. For example, a financial transaction may be defined by a number of states such as: initiated, authorized, receiver notified, receiver accepted/rejected. In this example, ACATS 115 includes interfaces that show a number of transactions (e.g. all transactions associated with a particular user) and the state associated with each transaction. Such state driven processes may be defined in test database 150. In various embodiments, workflow engine 148 may determine the logical and physical state of data residing in test database 150. For example, ACATS 115 may determine a state process flow of a financial transaction based upon at least one of transaction workflow data that explicitly defines the state process flow and/or ACATS 115 may determine state process flow data implicitly by, for example, drawing inferences from transaction history data. Such an ability to determine the various states that data may occur in facilitates the testing effort. For example, user 105 may examine transaction data at each state during transaction process flow. ACATS 115 also enables user 105 to "back out" or delete a transaction or a portion of a transaction. For example, ACATS 115 may determine that a particular transaction includes states A, B, C and D and user 105 may find it expedient in a testing effort to reset a transaction from state D to state B.

In various embodiments, ACATS 115 enables updating test database 150 such that the state of the data associated with a test account, a funding account or a first transaction do not reflect any indication that the first transaction was executed. Updating test database 150 may include modifying or deleting a database field in the test database and/or a database record in the test database.

In various embodiments, examination of data in the test database may include use of the native interfaces (as described above) or may involve accessing data from test database 150 via an API. In various embodiments, ACATS 115 comprises a plurality of APIs that enable ACATS 115 to interface with various systems (e.g. interfacing system 160). API specifications may be open or proprietary. In various embodiments, ACATS 115 includes a plurality of API's enabling third party or external applications to access the services of the test system 170. For example, a merchant may wish to create merchant specific user interfaces for their customers but also leverage a transaction processing platform enabled by target system 180. The merchant may hire a developer to develop merchant specific interfaces and functionality and develop interfaces to various APIs. In order to test the functionality and the APIs, the developer may initiate a transaction using interfacing system 160 and accessing test system 170 via API 121.

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to 'at least one of A, B, or C' is used in the claims or specification, it is intended that the phrase be interpreted to mean that A alone may be present in various embodiments, B alone may be present in various embodiments, C alone may be present in various embodiments, or that any combination of the elements A, B and C may be present in a single embodiment; for example, A and B, A and C, B and C, or A and B and C. All structural, chemical, and functional equivalents to the elements of the above-described exemplary embodiments that are known to those of ordinary skill in the art are expressly incorporated herein by reference and are intended to be encompassed by the present claims. Further, a list of elements does not include only those elements but may include other elements not expressly listed or inherent to such process, method, article, or apparatus.

The invention claimed is:

1. A method stored in a non-transitory computer readable medium and executed by a processor of a computer-based system programmed for automated configuration and testing, to implement the method comprising:
   receiving a test user creation request to create a test account;
   creating, in response to the receiving, a first test account on a test system;
   presenting a configuration interface to a user;
   receiving, via the configuration interface, first test data; and
   associating the first test data with the first test account on the test system, wherein the first test data is used to test a function of at least one of the test system or an interfacing system, wherein a first transaction comprises a transfer of value from the first test account to a second test account.

2. The method of claim 1, further comprising, in response to the creating the first test account, automatically generating, by the computer, second test data.

3. The method of claim 1, wherein the first test data comprises at least one of state data, transaction data or attribute values.

4. The method of claim 1, further comprising presenting a test account creation interface to the user, wherein the test account creation interface is different from an account creation interface of the test system.

5. The method of claim 4, wherein the test system is a near replica of a live system.

6. A method stored in a non-transitory computer readable medium and executed by a processor of a computer-based system programmed for automated configuration and testing, to implement the method comprising:
   receiving a configuration request to create a test account;
   creating, in response to the receiving, a first test account on a test database;
   determining a first funding account from a plurality of funding accounts;
   associating the first funding account with the first test account;
   enabling a user to examine data associated with at least one of the first test account, the first funding account or a first transaction, wherein a first test system executes the first transaction, wherein the first transaction comprises a transfer of value from the first test account to a second test account.

7. The method of claim 1, wherein the test system comprises the computer.

8. The method of claim 1, wherein the configuration request is received via at least one of a testing management interface or a testing management application programming interface (API).

9. The method of claim 1, wherein the receiving the request comprises receiving a request to create a preconfigured test account.

10. The method of claim 9, wherein the receiving the request further comprises receiving a request to create multiple test accounts.

11. The method of claim 10, further comprising creating multiple test accounts and associating a funding account with each of the multiple test accounts.

12. The method of claim 11, wherein the creating the first test account comprises creating the first test account based upon at least one of a predetermined set of attributes, predetermined attribute values or predetermined funding accounts.

13. The method of claim 1, wherein the receiving the request comprises receiving a request to create a custom test account and providing a custom test account creation interface.

14. The method of claim 1, further comprising:
receiving registration information from the user wherein the registration information comprises user profile information and an identification of the test system; and
registering the user by at least one of updating the database with the user profile information or associating the user with the test system.

15. The method of claim 14, wherein the registering further comprises allocating the plurality of funding accounts to the user.

16. The method of claim 15, wherein the plurality of funding accounts comprises five credit card accounts and five bank accounts.

17. The method of claim 1, further comprising: receiving custom test account configuration data from at least one of the custom test account creation interface or a custom test account creation application programming interface (API); and updating the test database based upon the custom account configuration data.

18. The method of claim 1, further comprising receiving a funding request to fund the first test account using value from the first funding account.

19. The method of claim 18, wherein the funding request comprises a request to process an automated clearing house (ACH) transaction to transfer value from the first funding account, wherein the first funding account is a bank account.

20. The method of claim 19, wherein, in response to the receiving the funding request, the value is immediately transferred from the first funding account to the first test account.

21. The method of claim 1, wherein the executing the first transaction comprises executing processing logic that is substantially similar to a target system processing logic.

22. The method of claim 1, wherein a request to execute the first transaction is received by the test system via an application programming interface (API).

23. The method of claim 22, further comprising verifying that the execution request is associated with a test account that is designated as an application owner of the test system.

24. The method of claim 23, further comprising receiving a change owner request and, in response to receiving the change owner request, updating the database to designate a second test account as the application owner of the test system.

25. The method of claim 24, wherein the change owner request is received via at least one of the API or a testing management interface.

26. The method of claim 1, further comprising providing a test interface, wherein the test interface comprises data fields that correspond to data expected by a first application programming interface (API), and wherein the first transaction request is received via the test interface.

27. The method of claim 1, further comprising providing a configuration interface to manipulate test account data associated with the first test account.

28. The method of claim 27, wherein the configuration interface enables the user to at least one of:
change an account balance associated with the first funding account;
request a automated clearing house (ACH) value transfer from the first funding account to the first test account;
request the immediate release of funds associated with a pending ACH value transfer from the first funding account to the first test account;
reset a daily transaction accumulation counter;
reset a monthly accumulation counter;
change a daily transaction limit associated with the first account; or
change a monthly transaction limit associated with the first account.

29. The method of claim 1, further comprising receiving a request to reset the first transaction.

30. The method of claim 29, further comprising updating data in the database such that the state of the data associated with the first test account, the first funding account and the first transaction do not reflect any indication that the first transaction was executed, wherein the updating data comprises at least one of modifying or deleting at least one of a database field in the test database or a database record in the test database.

31. The method of claim 29, further comprising updating first transaction data in the database to an intermittent state, wherein the intermittent state reflects a state of the transaction data after an initiation of the first transaction but before a completion of the first transaction, wherein the first transaction comprises multiple data states.

32. The method of claim 29, further comprising determining a state process flow of the first transaction based upon at least one of transaction workflow data or transaction history data and updating the first transaction data based upon the state process flow.

33. The method of claim 1, further comprising providing a test interface that enables the user to review test data associated with a plurality of test accounts associated with the user.

34. The method of claim 33, wherein the test interface comprises a messaging interface that enables the user to review test system messages associated with the plurality of test accounts, wherein the test system messages comprise at least one of emails or text messages.

35. The method of claim 34, wherein the messaging interface is configured to present the test system messages to at least one of a user, a test account or a funding account level.

36. An automated configuration and testing system comprising:
a network interface communicating with a memory;
the memory communicating with a processor for automated configuration and testing, wherein the memory stores a computer program; and
the processor, when executing the computer program, performs operations comprising:
receiving, by the processor, a configuration request to create a test account;
creating, by the processor and in response to the receiving, a first test account on a test database;
determining, by the processor, a first funding account from a plurality of funding accounts;
associating, by the processor, the first funding account with the first test account;
receiving, by the processor, registration information from a user wherein the registration information comprises user profile information and an identification of the testing system; and
registering, by the processor, the user by at least one of updating the test database with the user profile information or associating the user with the testing system, wherein the registering further comprises allocating the plurality of funding accounts to the user, wherein the plurality of funding accounts comprise five credit card accounts and five bank accounts; and enabling, by the processor, a user to examine data associated with at least one of the first test account, the first funding account or a first transaction, wherein a test system executes the first transaction.

37. A non-transitory computer-readable storage medium having computer-executable instructions stored thereon that, in response to execution by a computer for automated configuration and testing, causes the computer to perform operations comprising:

receiving, by the computer, a configuration request to create a test account;

creating, by the computer and in response to the receiving, a first test account on a test database;

determining, by the computer, a first funding account from a plurality of funding accounts;

associating, by the computer, the first funding account with the first test account;

enabling, by the computer, a user to examine data associated with at least one of the first test account, the first funding account or a first transaction, wherein a test system executes the first transaction; and receiving, by the computer, a funding request to fund the first test account using value from the first funding account, wherein the funding request comprises a request to process an automated clearing house (ACH) transaction to transfer value from the first funding account, wherein the first funding account is a bank account, wherein, in response to the receiving the funding request, the value is immediately transferred from the first funding account to the first test account.

38. An automated configuration and testing system comprising:

a network interface communicating with a memory;

the memory communicating with a processor for automated configuration and testing, wherein the memory stores a computer program;

receiving, by the processor, a configuration request to create a test account;

creating, by the processor and in response to the receiving, a first test account on a test database;

determining, by the processor, a first funding account from a plurality of funding accounts;

associating, by the processor, the first funding account with the first test account;

receiving, by the processor, an execution request to execute a first transaction using the first test account;

executing, by the processor, the first transaction;

enabling, by the processor and in response to the executing, a user to examine data associated with at least one of the first test account, the first funding account or the first transaction, wherein a request to execute the first transaction is received by the testing system via an application programming interface (API); and verifying that the execution request is associated with the test account that is designated as an application owner of the testing system.

\* \* \* \* \*